(12) United States Patent
Battilana et al.

(10) Patent No.: US 6,304,367 B1
(45) Date of Patent: Oct. 16, 2001

(54) PROCESS FOR THE REMOVAL OF WATER FROM EVACUATED CHAMBERS OR FROM GASES

(75) Inventors: Paolo Battilana, Seregno; Giorgio Vergani, Monza; Claudio Boffito, Rho; Marco Succi, Milan; Luca Toia, Busto Arsizio, all of (IT)

(73) Assignee: SAES Getters S.p.A., Milan (IT)

( * ) Notice: Subject to any disclaimer, the term of this patent is extended or adjusted under 35 U.S.C. 154(b) by 0 days.

(21) Appl. No.: 09/315,600

(22) Filed: May 20, 1999

(30) Foreign Application Priority Data

May 21, 1998 (IT) .............................. MI98A1138

(51) Int. Cl.$^7$ .............................. B01J 27/34; H01S 3/00
(52) U.S. Cl. .............................. 359/333; 502/5; 423/488
(58) Field of Search .............................. 502/5; 359/333; 423/488

(56) References Cited

U.S. PATENT DOCUMENTS 5,955,393 * 9/1999 Moskovitz et al. ............ 502/5

FOREIGN PATENT DOCUMENTS

| 0428898 | 5/1991 | (EP) . |
| 0654442 | 5/1995 | (EP) . |
| 0707360 | 4/1996 | (EP) . |
| 1278466 | 6/1972 | (GB) . |

* cited by examiner

Primary Examiner—Mark Hellner
(74) Attorney, Agent, or Firm—Oppenheimer Wolff & Donnelly LLP (57) ABSTRACT

A process for the conversion of boric acid to dry boron oxide by thermal decomposition is described. Boron oxide may be produced as a powder or in the form of pellets, and in either form may additionally be enclosed in a gas permeable container to control particulate contamination. Applications are further disclosed for the use of boron oxide formed by this process to remove water from evacuated chambers and from gases. Specific applications include removing water from both inert gases and reactive gases, especially halogen and halogenated gases. Further applications directed to optical amplifiers and gas purifiers are also discussed.

18 Claims, 6 Drawing Sheets

PROCESS FOR THE REMOVAL OF WATER FROM EVACUATED CHAMBERS OR FROM GASES

BACKGROUND OF THE INVENTION

This invention relates generally to the field of desiccation and more specifically to a process for the removal of water from evacuated chambers or from gases by means of boron oxide obtained by boric acid decomposition under vacuum or under a dry gas flow.

Water is one of the main contaminants in vacuum systems and in gases for advanced applications, such as those used in the semiconductor industry. Consequently, numerous industrial applications call for the removal of water and water vapor. Water vapor needs to be removed from evacuated spaces employed as thermal insulation, such as the vitreous or metallic gaps in thermos flasks and the evacuated panels filled with polymeric materials used in refrigeration systems. The use of gas sorbing materials inside such panels is disclosed, for example, in U.S. Pat. No. 5,544,490. Another application for water sorption includes the manufacture of mechanical microdevices, sometimes referred to as micromachines or MEMs. A further example of the need to remove water is in polymer-encapsulated integrated circuits as described in U.S. Pat. No. 4,768,081.

Another important application is in laser devices, for example power lasers used in amplifiers for optical fiber communications (hereinafter referred to as "optical amplifiers"). Optical amplifiers consist, in large part, of a lasing source in an enclosed chamber filled with an inert gas, typically nitrogen. Upon their manufacture, optical amplifier chambers frequently contain hydrocarbon impurities as a result of the production process. These impurities tend, over time, to lower the efficiency of the device by forming an obscuring deposit on the laser's exit window. In order to eliminate these impurities, small amounts of oxygen are added to the nitrogen atmosphere. The laser beam causes the oxygen to react with the hydrocarbons to form water and $CO_2$. The $CO_2$ does not interfere with the act or operation of the optical amplifier, however the water has to be removed. The use of impurity getters in laser enclosures is disclosed in European Patent Application EP707360 A1 published Apr. 17, 1996 and issued as EP707360 B1 on Mar. 4, 1998.

Water removal is also extremely important for purified gases, especially as used in the microelectronics industry for deposition and etching act or operations. The purity levels needed for these process gases continue to increase as the tolerances for defects continue to decrease. For example, the industry currently requires noble gases such as helium and argon to contain no more than about 5 parts per billion (ppb) of total impurities. The presence of water vapor is particularly serious in halogen and halogenated gases such as chlorine, hydrogen fluoride, hydrogen chloride, hydrogen bromide, silicon tetrachloride, trichlorosilane and dichlorosilane. Traces of water in these gases, widely used in microelectronics industry, form highly corrosive compounds such as hydrofluoric acid inside gas pipelines and reaction chambers. Corrosive processes create particles in these ultraclean environments lowering yields and necessitating costly downtime and equipment replacement. Other gases employed in the industry, from which water needs to be eliminated, include, among others, boron compounds such as boron trichloride, boron trifluoride, and diborane; nitrogen compounds such as nitrogen trifluoride, nitrous oxide, nitric oxide, and nitrogen dioxide; hydrides such as silane, arsine, phosphine; sulfur hexafluoride and tungsten hexafluoride; chlorine trifluoride; hydrazine and dimethyl hydrazine.

Water removal from vacuum chambers and process gases typically is carried out by means of chemical or physical sorbents. Examples of physical sorbents include zeolites, porous alumina, and silica gel. These sorbents are not suitable for many high technology applications, however, because their sorption of water, as well as of the other gases, is reversible, and the sorbed gases may be released in the presence of a high vacuum or upon heating. Another problem occurs when the process gas itself is sorbed, for example, when certain zeolites are used to remove water vapor from gaseous HCl, as sorbed HCl diminishes the sorption efficiency for water.

Chemical sorbents have been known for a long time. The most effective chemical sorbents have been found to be alkaline-earth metal oxides, particularly barium and calcium oxides, and perchlorates of magnesium and barium. Other strong chemical sorbents include copper sulfate, calcium and zinc chlorides, and phosphorus pentoxide. Some of these materials, however, are not suitable in particular applications. For example, alkaline-earth metal oxides are basic and cannot be used for removing water from halogen or halogenated gases because they chemically react with these gases.

A third class of materials suitable for chemical moisture sorption include zirconium- and titanium-based alloys, generally known as non-evaporable getter alloys. These alloys sorb a wide range of gases, including $O_2$, CO, $CO_2$, and water. Unfortunately, the sorbing capacity of these alloys at room temperature is very limited. Additionally, these materials cannot be used to purify reactive gases, such as the above-mentioned halogen and halogenated gases, as they react with these gases to form metal halides which then contaminate the process gas.

The problem of water removal from halogen or halogenated gases has prompted the development of new materials. U.S. Pat. Nos. 4,853,148 and 4,925,646 disclose water removal from HF, HCl, HBr and HI by means of supported metal halides having the general formula $MX_y$, where X is a halogen element and y corresponds to the valency of the metal M, which may be 1, 2, or 3. Additionally, these patents disclose metal halides of the form $MX_{y-1}$ that may be covalently bonded to a support. U.S. Pat. No. 4,867,960 discloses the use of $SiCl_4$ and chlorides of metals with valencies of at least four, with or without support, for water removal from HCl. Finally, U.S. Pat. No. 5,057,242 discloses the removal of water from chlorosilane gases by using materials of the general formula $R_{a-x}MCl_x$, where R is an alkyl, x is in the range of 0 to a, and M is a metal selected from the group consisting of the alkali metals, alkaline-earth metals, and aluminum.

SUMMARY OF THE INVENTION

The present invention provides a process for removing water from vacuum chambers and gases. In one aspect of the present invention, the process includes the following act or operations: first producing boron oxide by boric acid decomposition at a temperature in the range from about 70° C. to about 200° C. in a reaction chamber under a dry gas flow or at a pressure lower than about 500 mbar; and secondly, contacting the resulting boron oxide with the vacuum chamber or with the gas from which water is sought to be removed.

Embodiments of the present invention include starting with boric acid either in the form of orthoboric acid, metaboric acid, or any mixture of the two. Further embodiments include using a dry gas flow during the decomposition reaction where the dry gas is selected from the group consisting of noble gases, nitrogen, air, or any mixture of these gases.

Other embodiments of the present invention are directed to starting with boric acid in the form of pellets or loose powder. In the case of a loose powder, additional embodiments are directed to the arrangement of the powder in beds no thicker than about 1 cm, where more than one bed may be stacked inside the reaction chamber. Further embodiments are directed to the arrangement of the powder in fluidized beds, so as to continuously agitate powder in the reaction chamber. Still other embodiments are directed to performing the decomposition reaction on boric acid, either as pellets or loose powder, already sealed in a gas permeable container. Further embodiments relate to the construction of a gas permeable container from stainless steel having one or more porous septa made of sintered metal powders, where the purpose of the septa is to completely retaining the boron oxide within the container while allowing for the rapid exchange of gases.

Still other embodiments are directed to the second act or operation of the process of the present invention. These include using the boron oxide produced in the first act or operation to remove water from gases at temperatures below about 120° C. and to remove water from evacuated chambers at temperatures below about 80° C. Further embodiments are directed to the type of gas that is sought to be dried, which may include halogens, halogenated compounds, and mixtures of these gases. Another embodiment includes the application of the process of the present invention to the removal of water from the evacuated spaces within optical amplifiers.

Yet other embodiments are directed to gas purifiers and optical amplifiers. Embodiments directed to gas purifiers include gas permeable containers filled with boron oxide produced by the decomposition of boric acid and having porous septa for preventing particulate contamination while allowing for the exchange of gases. A further embodiment is a process for the use of a gas purifier according to the present invention to remove water from a gas. Embodiments directed to optical amplifiers include the incorporation of boron oxide produced by the decomposition of boric acid, which may or may not be confined within a gas permeable container, within the evacuated space of an optical amplifier.

Advantages of the present invention will become apparent to those skilled in the art upon a reading of the following detailed description of the preferred embodiments, the examples, and the figures.

DETAILED DESCRIPTION OF THE PREFERRED EMBODIMENTS

Figure 1:
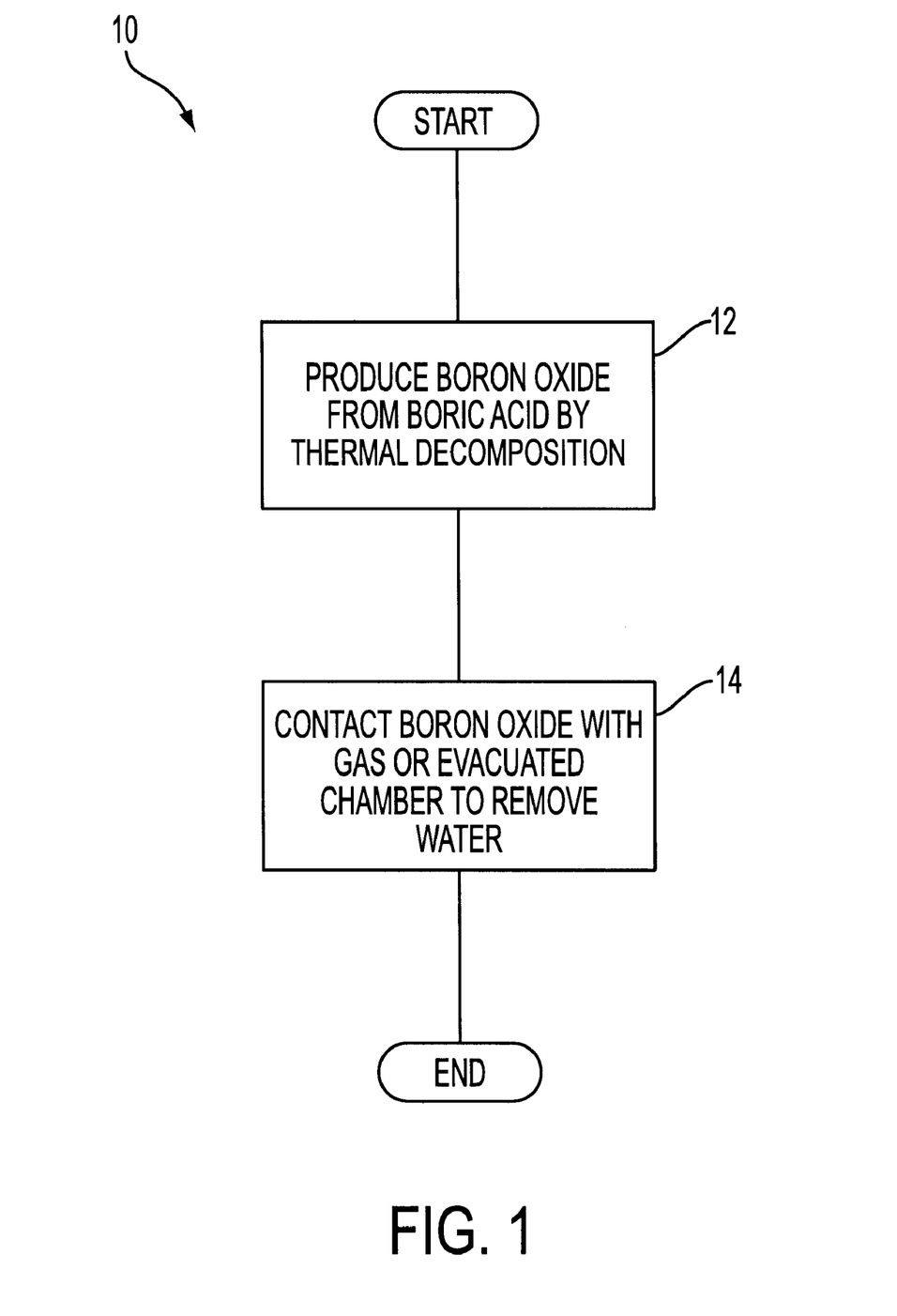
FIG. 1 is a process diagram illustrating the two operations of the present invention.

The present invention 10, as shown in the process diagram in FIG. 1, comprises a first act or operation 12 of decomposing boric acid to form boron oxide, and a second act or operation 14 of contacting the boron oxide with a gas or vacuum chamber sought to be purged of water vapor. Boron oxide, $B_2O_3$, is a common commercially available product frequently employed as a vitrification agent in the production of certain glass compositions, but it has not previously been employed for water sorption in industrial applications. The production of boron oxide by boric acid decomposition proceeds according to the reaction:

$$2\ H_3BO_3 \rightarrow B_2O_3 + 3\ H_2O \tag{I}$$

This reaction is well known in the art, and is described, for example, in "Inorganic Syntheses", by W. Conard Fernelius, vol. II, McGraw-Hill, 1946, pages 22–23. This text indicates that the decomposition temperature for boric acid is 200° C. Although the starting reagent provided in the above reaction is orthoboric acid, $H_3BO_3$, an intermediate reaction product, metaboric acid, $HBO_2$, also works well as the starting reagent in the first act or operation of the present invention. Hereinafter, reference to boric acid is meant to encompass both orthoboric and metaboric acid unless otherwise stated.

In the first act or operation 12 of the present invention 10, varying the temperature within a range of about 70° C. to about 200° C. affects both the rate of the decomposition reaction and the porosity of the boron oxide product. The rate of reaction decreases with decreasing temperature, and at temperatures below about 70° C. the rate of reaction becomes negligible. On the other hand, boron oxide produced at temperatures above about 200° C. has poor water sorption characteristics due to reduced porosity. Therefore, the temperature range of about 70° C. to about 200° C. works well for the first act or operation 12 of the present invention 10. The second act or operation 14 of the present invention 10 may be carried out at temperatures below about 120° C. The ability of boron oxide to sorb water above about 120° C. decreases significantly. However, for embodiments in which the boron oxide is meant to contact a vacuum chamber, an upper temperature limit of about 80° C. may be desirable in order to avoid releasing previously sorbed water.

Boric acid decomposition may be accomplished within fixed beds or fluidized beds, according to procedures well known in the chemical arts. In the case of fixed bed operation, the thickness of the initial boric acid bed within the reaction chamber has been found to influence the amount of time necessary to carry the reaction to completion. Thin boric acid beds proceed to completion faster than thicker beds because water is more easily released from thinner layers. Reaction beds less than about 1 cm in thickness work well in the first act or operation 12 of the present invention 10. Additionally, increasing the boric acid bed surface area may also reduce the decomposition process time. It is therefore desirable to arrange the boric acid within the reaction chamber in one or more thin wide beds. More than one boric acid bed may be provided for within the reaction chamber by a plurality of stacked layers.

As an alternative, the boric acid may be processed in fluidized beds that continuously agitate the boric acid powder as it is converted to boron oxide. Fluidized beds may be achieved, for example, by directing a gas flow from the bottom of the reaction chamber upward through the boric acid powder. Fluidized conditions may also be achieved by vibrating the bed or with mechanical mixing blades. These and other techniques are well known in the art. Fluidized beds provide additional advantages including reducing the time to completion of the decomposition reaction and preventing clumping of the loose powder.

In one embodiment of the first act or operation 12 of the present invention 10 the decomposition of boric acid is performed under a dry gas flow. The gas flow through the decomposition chamber is preferably sufficient to replace the volume of the chamber at least about 5 times per minute. Flow rates below this level may not be sufficient to effectively remove from the reaction chamber the water produced by the boric acid decomposition. Under such conditions a deleterious partial pressure of water is maintained in the chamber that may retard complete decomposition. Many gases may be suitable as the dry gas in this process including the noble gases, nitrogen, air, and mixtures thereof.

According to another embodiment of the present invention 10, reaction (I) may be carried out in the first act or operation 12 at pressures below about 500 mbar. Pressure in the reaction chamber may be controlled, for example, by a porous septum attached to a vacuum pump. Performing the decomposition at pressures of about 500 mbar or less can be desirable for reducing the time needed to complete the process. Since the decomposition reaction produces water vapor, the reaction chamber should be continuously pumped, for example, with a rotary pump. The use of a porous septum is desirable for preventing boric acid or its decomposition products from being drawn into the pumping line. The porous septum, for example, can be a sintered disk of metal powder.

The second act or operation 14 of the present invention 10 involves contacting the boron oxide produced in the first act or operation with either a gas or with the internal volume of a vacuum chamber. However, for many of the intended applications of the present invention 10, the boron oxide produced in the first act or operation 12 must be enclosed in a gas permeable container capable of completely retaining the boron oxide in order to avoid particle contamination of the vacuum chamber or gas. Therefore, yet another embodiment of the present invention 10 is to prepare boron oxide according to the first act or operation 12 directly inside a gas permeable container. Such a container may be formed, for example, from a stainless steel enclosure having an open end capped by a porous septum. As described previously, a septum may consist of a sintered disk of steel powder. Such a device is disclosed, for example, in patent application WO 97/19894, incorporated herein by reference. Further, since boric acid may be readily formed into boric acid pellets, still yet another embodiment of the present invention 10 is to carry out the decomposition process of the first act or operation 12 on boric acid pellets placed within a gas permeable container.

Different embodiments may be more advantageous depending upon whether the boron oxide produced in the first act or operation 12 is made as pellets or as a loose powder, with or without a gas permeable enclosure. For example, some embodiments of the present invention 10 will require rapid water sorption in the second act or operation 14, such as in a process gas stream. A loose powder of boron oxide may be advantageous for such applications, compared to boron oxide pellets, because a loose powder may be more permeable to a flowing gas and provide a higher surface area.

On the other hand, the higher density of boron oxide when formed as pellets may provide the advantage of a greater mass for the same volume compared to a loose powder. Therefore, pellets may be advantageous where applications in the second act or operation 14 require long-term use or small volumes. For example, when the evacuated volume in the second act or operation 14 is a refrigerator jacket or similar device, the service life may be on the order of decades, and it may be desirable to seal the boron oxide inside the jacket and never have to replace it. Since maximum sorption capacity is a function of the amount of the boron oxide provided, pellets would be advantageous in such long-term applications because they provide more total mass per volume than a loose powder. Similarly, for applications such as optical amplifiers, both long-term use and limited space requirements may make boron oxide pellets advantageous over loose powders.

As previously noted, some applications, such as those involved with semiconductor processing, may require the use of gas permeable containers to prevent particle contamination. A gas permeable container may be filled with either a loose powder or at least one pellet. In some embodiments the boron oxide may be produced in the first act or operation 12 by decomposition of boric acid already within a gas permeable container, and other embodiments may involve filling a gas permeable container with boron oxide as part of the second act or operation 14. Gas permeable containers may be desirable, even in applications where such containers are not essential, because they may be more easily handled by automated equipment and may reduce the likelihood of boron oxide spills in production environments.

Another embodiment of the present invention 10 is an optical amplifier produced according to the present inventive process. The boron oxide, produced from boric acid according to the first act or operation 12, may be in the form of one or more pellets or as a loose powder, and may or may not be contained within a gas permeable container. In the second act or operation 14 of the present invention 10 the boron oxide of the first act or operation 12 is sealed inside the optical amplifier such that it is in contact with the amplifier's internal evacuated space. One advantage of an optical amplifier according to this embodiment is that the sealing process may be performed under vacuum at a temperature of approximately 100° C. This combination of low pressure and elevated temperature can help regenerate the boron oxide if it happened to sorb any water after the completion of the first act or operation 12. The advantage of the boron oxide regeneration during the final sealing process is that the preceding steps in assembling the optical amplifier need not be carried out under vacuum.

Figure 2:
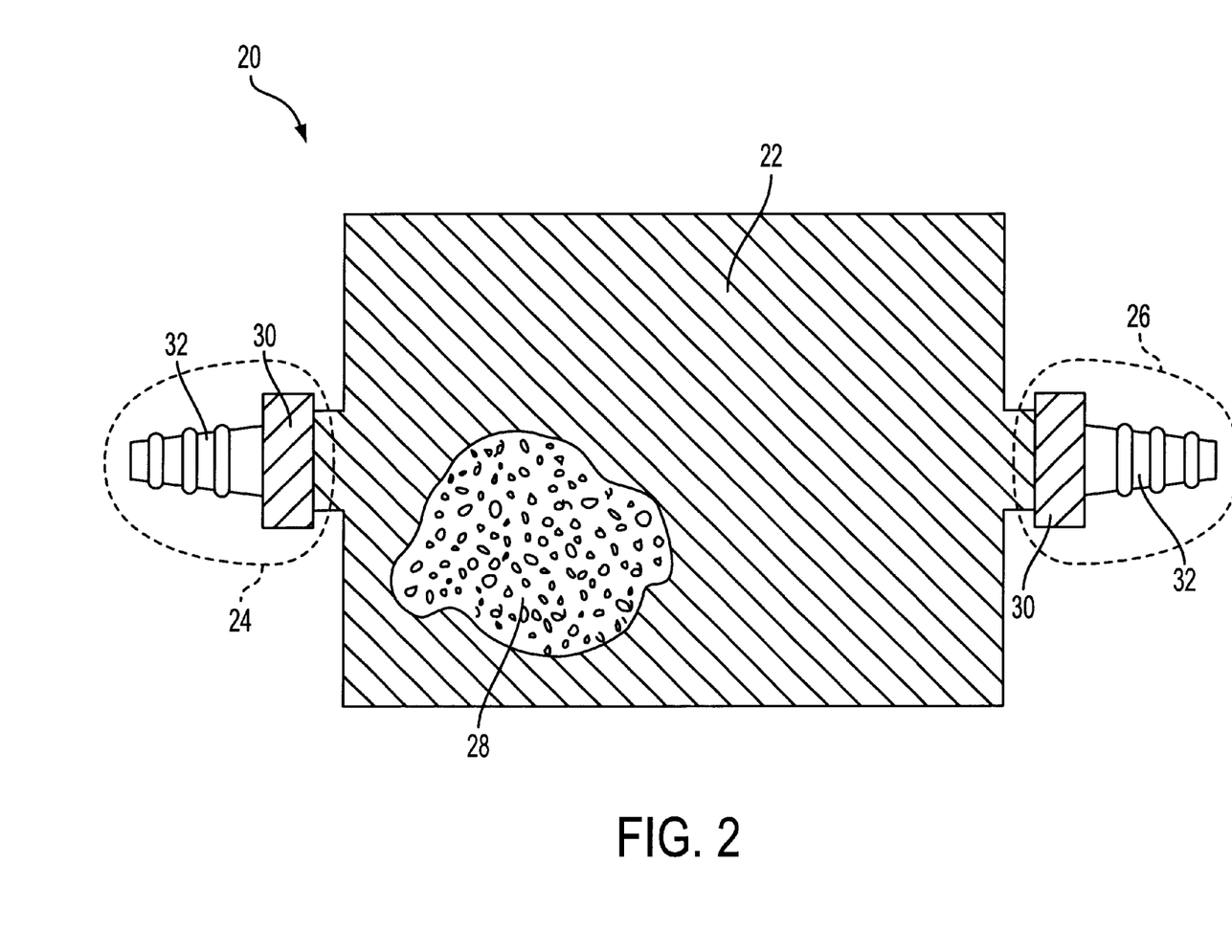
FIG. 2 is a plan view of a gas purifier according to the present invention.

FIG. 2 shows a gas purifier 20 produced according to the present inventive process consisting of a container 22 having an inlet 24 and an outlet 26 and filled with boron oxide 28. The boron oxide 28, produced from boric acid according to the first act or operation 12 of the present invention 10, may be in the form of one or more pellets or as a loose powder. The boron oxide 28 may be produced in the first act or operation 12 from boric acid placed within the container 22. Alternately, the boron oxide 28 may be sealed within the container 22 at the beginning of the second act or operation 14. For the purposes of this embodiment, the container 22 is preferably in the form of a cylinder with an inlet 24 and an outlet 26 placed at opposite ends, with both the inlet 24 and the outlet 26 each being fitted with a porous septum 30 and a fitting 32 for attaching a gas line. In the second act or operation 14 of the invention 10 the boron oxide 28 of the first act or operation 12 is placed in contact with a gas by attaching the gas purifier 20 in-line with a flowing gas.

A gas purifier 20 according to this embodiment can vary in size from only a few cubic centimeters, like gas purifiers of the prior art that are commonly placed upstream of and next to semiconductor processing chambers, to purifiers with volumes on the order of cubic meters. A gas purifier 20 according to this embodiment can be manufactured according to procedures well known in the art, for example, by employing stainless steel electropolished on the interior surface for the container 22. A porous septum 30 is preferably positioned at both the inlet 24 and outlet 26 of the gas purifier 20, thus preventing boron oxide 28 powder from contaminating the gas line. Great Britain Patent No. 2,177,079, incorporated herein by reference, is referred to for general details relating to the manufacture of gas purifiers.

Yet another embodiment of the present invention 10 is directed to the use of the aforementioned gas purifier 20 to purify a gas flow. Use of this process may provide some advantages with respect to prior art systems used to remove water from flowing gases. First, use of boron oxide does not require a supporting material, thus reducing the necessary volume of the purifier for the same weight of active material. Secondly, boron oxide is a very light weight material, further reducing the weight of a purifier with the same sorption capacity but made from materials used in the prior art. Further, boron oxide effectively sorbs water at room temperature, unlike some purifiers of the prior art that require the use of heaters to be effective. Further still, boron oxide only sorbs water and is effectively inert otherwise. This is contrary to the behavior of many other absorbents, such as alkaline-earth oxides, that may react with impurities in the gas stream, even if only present in trace quantities, to form new and undesirable gas species. Extensive testing conducted on purifiers of the present invention under different conditions have shown no by-products in the downstream gas flows attributable to chemical reactions between the boron oxide and the inlet gases (both carrier gases and impurity species), thus indicating that generation of such by-products, if any, are at levels below the detection limits of the analytical equipment employed, generally below 100 ppb.

Further advantages of this embodiment may be realized when the gas being purged of water is a halogen gas, a halogenated gas, or mixtures of these. Examples of such gases include fluorine, chlorine, bromine, and iodine gases, boron trichloride, boron trifluoride, nitrogen trifluoride, sulfur hexafluoride, tungsten hexafluoride, chlorine trifluoride, mixtures thereof, and mixtures of any of these gases with any non-halogenated gas. Materials known in the prior art for sorbing water from this category of gases generally require an activation or conditioning step prior to use and typically have to be held in the gas stream on a support medium. The use of a support for these materials, as previously noted, takes up additional space without contributing to the sorption capacity of the device. Additionally, a common support material is alumina, which at high gas pressures is known to react with halogenated gases to produce volatile aluminum trihalides that may contaminate the gas flow from the purifier outlet. The problem of aluminum trihalide formation has limited the use of prior art purifiers to low pressure applications. By contrast to the prior art, the purifier of the present invention does not require an activation step prior to use, does not need a support medium for the boron oxide, and therefore may be used to sorb water from halogenated gases at high pressures without creating aluminum trihalide contamination.

The invention will be further illustrated by the following examples. These non-limiting examples illustrate some embodiments intended to teach those skilled in the art how to put the invention into practice and how to provide the best considered way for carrying out the invention.

EXAMPLE 1

This example relates to the preparation of boron oxide by decomposition of boric acid under vacuum.

100 g of powdered $H_3BO_3$ with a purity of 99.5% (Aldrich, Milan, Cat. No. 23,646-2), is spread over a surface of about 0.3 $m^2$ in a steel container; to create a boric acid bed thickness of about 3 mm. The steel container is placed within a vacuum oven. A rotary pump is used to reduce the pressure in the oven to $6.7 \times 10^{-2}$ mbar, and the following thermal treatment is performed while the oven is continually pumped:

heating at 1° C./min from room temperature to 120° C.;

maintaining the temperature at 120° C. for 6 hours;

heating at 2° C./min up to 140° C.; and maintaining the temperature at 140° C. for 17 hours.

During this treatment the oven pressure reaches a maximum value of about 2 mbar due to the release of water from the boric acid. Boron oxide powder produced by this method constitutes sample 1. The same test was performed in a CAHN thermobalance, model D 200, starting with 50 mg of boric acid. A mass spectrometer, branching from the pumping line, was connected to the thermobalance, to demonstrate that only water is measurably released during the decomposition of the boric acid. The weight loss of the sample at the completion of the process was about 44.1%, compared to a theoretical value of 43.7% for boric acid decomposition to boron oxide. The small difference can be ascribed to physically sorbed water within the starting material. The thermobalance test confirms that sample 1 is boron oxide substantially free of water.

EXAMPLE 2

This example relates to the preparation of boron oxide by the decomposition of boric acid in a dry gas flow.

The procedure described in example 1 is repeated, differing only in that the act or operations are carried with a nitrogen flow through the vacuum oven at a rate of 1 standard liter per minute (slpm). In order to guarantee the absence of water from the nitrogen flow, the nitrogen gas is first passed over a powder bed of an alloy having weight composition Zr 76.5%–Fe 23.5%, maintained at 350° C. This alloy is produced and sold by SAES Getters S.p.A., Lainate, Italy, under the name St 198, and is well known in the field for its capacity to sorb oxygenated gases. Boron oxide powder produced by this method constitutes sample 2.

EXAMPLE 3

Figure 3:
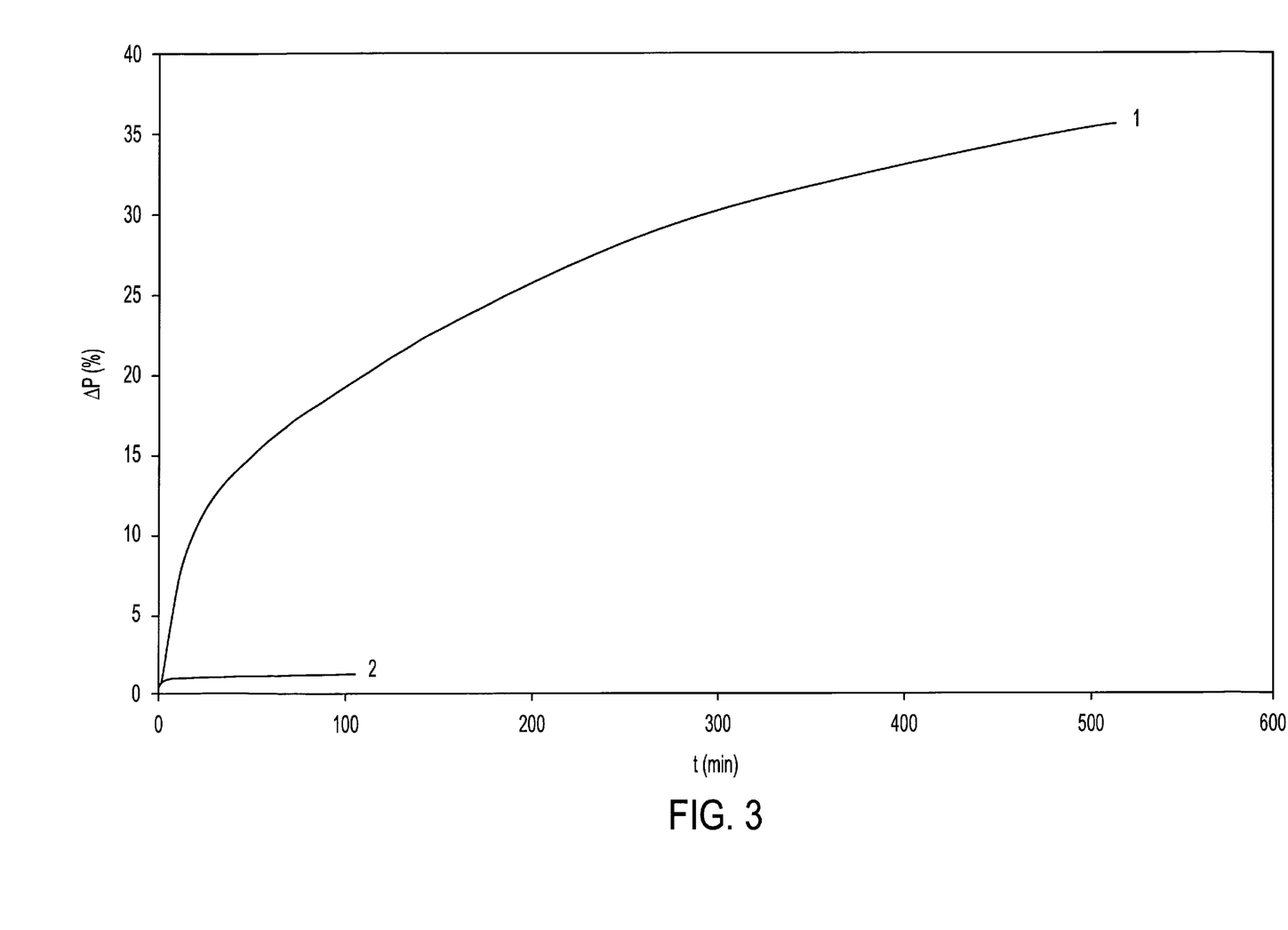
FIG. 3 is a plot of weight increase as a function of time for a water sorption test in a vacuum chamber performed according to the present invention (Curve 1), and performed according to the prior art (Curve 2)

This example relates to the use of Sample 1 to sorb water under vacuum. 51 mg of boron oxide powder from Sample 1 are loaded into the sample holder of a CAHN D 200 thermobalance to measure the weight increase as water vapor is introduced into the measuring chamber. During the test, the temperature of the measuring chamber is maintained at a constant 25° C. A rotary pump and a turbomolecular pump are used in combination to initially lower the pressure in the measuring chamber to $10^{-5}$ mbar. Next, the pump is isolated from measurement chamber and water vapor is then introduced into the chamber up to a pressure of 5 mbar through a needle valve. The weight increase of the sample is recorded by the thermobalance. The test results, in terms of weight change ($\Delta P\%$) as a function of time (t) in minutes, are presented as Curve 1 in FIG. 3.

EXAMPLE 4 COMPARATIVE

This example relates to water sorption under vacuum by a commercial boron oxide sample.

For the purpose of comparison, the test in Example 3 is repeated using instead 291 mg of $B_2O_3$ with a purity of 99.98% (Aldrich, Milan, Cat. No. 33,907-5). The test results are presented as Curve 2 in FIG. 3.

EXAMPLE 5

This example relates to water sorption by Sample 1 in an inert gas atmosphere.

A gas purifier is assembled from an AISI 304 cylindrical steel container having an internal volume of 15 ml filled with powder from sample 1. The container has openings at both ends provided with fittings for gas lines and sintered steel porous septa for confining particulates. Prior to the water sorption test, the purifier is slowly heated to 140° C. for 10 hours in a dry nitrogen flow to completely degas the walls of the steel container, and then allowed to cool to room temperature.

The test consists of passing nitrogen containing 7 ppm of water vapor through the purifier at a rate of 0.5 slpm. The gas exiting from the purifier outlet is analyzed by a Microdowser™ MD2 moisture analyzer, manufactured and sold by SAES Getters S.p.A., Lainate, Italy, which has a detection limit of 5 ppb for water. At the initiation of the test the amount of water measured in the outlet gas flow is below the analyzer's detection limit. The test is continued until the analyzer first detects water in the outlet gas flow, indicating that the purifier has lost its efficiency. This occurs after the purifier has been continuously operated for approximately 640 hours. The water capacity of the purifier may then be calculated, based on the knowledge of the test parameters, to be about 9 l/l (liters of sorbed water per liter of boron oxide). Extensive testing with a flow rate set at 1 slpm and an input water concentration in the range of 7–10 ppm has repeatedly demonstrated purifier capacities in the range from 9 l/l to 25 l/l.

EXAMPLE 6

This example relates to water sorption in an inert gas atmosphere by boron oxide prepared as in Example 2.

The test of example 5 is repeated, with the only difference being that the purifier is loaded with powder of Sample 2. The purifier capacity calculated from this test was approximately 4 l/l.

EXAMPLE 7 CAOMPARATIVE

This example relates to water sorption in an inert gas atmosphere by a commercial sample of boron oxide.

The test of example 5 is repeated, with the only difference being that the purifier is loaded with 15 ml of $B_2O_3$ as used in Example 4. The purifier capacity calculated from this test was about 0.5 l/l. Two repetitions of this same test gave capacities of 0.9 and 0.3 l/l.

EXAMPLE 8

This example relates to water sorption from a HCl gas flow by boron oxide prepared according to Example 1.

A purifier is prepared as described in Example 5. The purifier is degassed with a dry nitrogen flow at 140° C. for 10 hours, as further described in Example 5, prior to the water sorption test. A 0.2 slpm flow of a 1:1 by volume mixture of HCl gas and nitrogen gas containing 15 ppm of water vapor is passed through the purifier. The outlet gas is analyzed with a Protege' FTIR spectrophotometer (Nicolet, Madison, Wis., USA) equipped with a model 4Runner gas cell (CIC Photonics, Albuquerque, N.Mex., USA). The detection limit of the analyzer for water in HCl is approximately 30 ppb.

Figure 4:
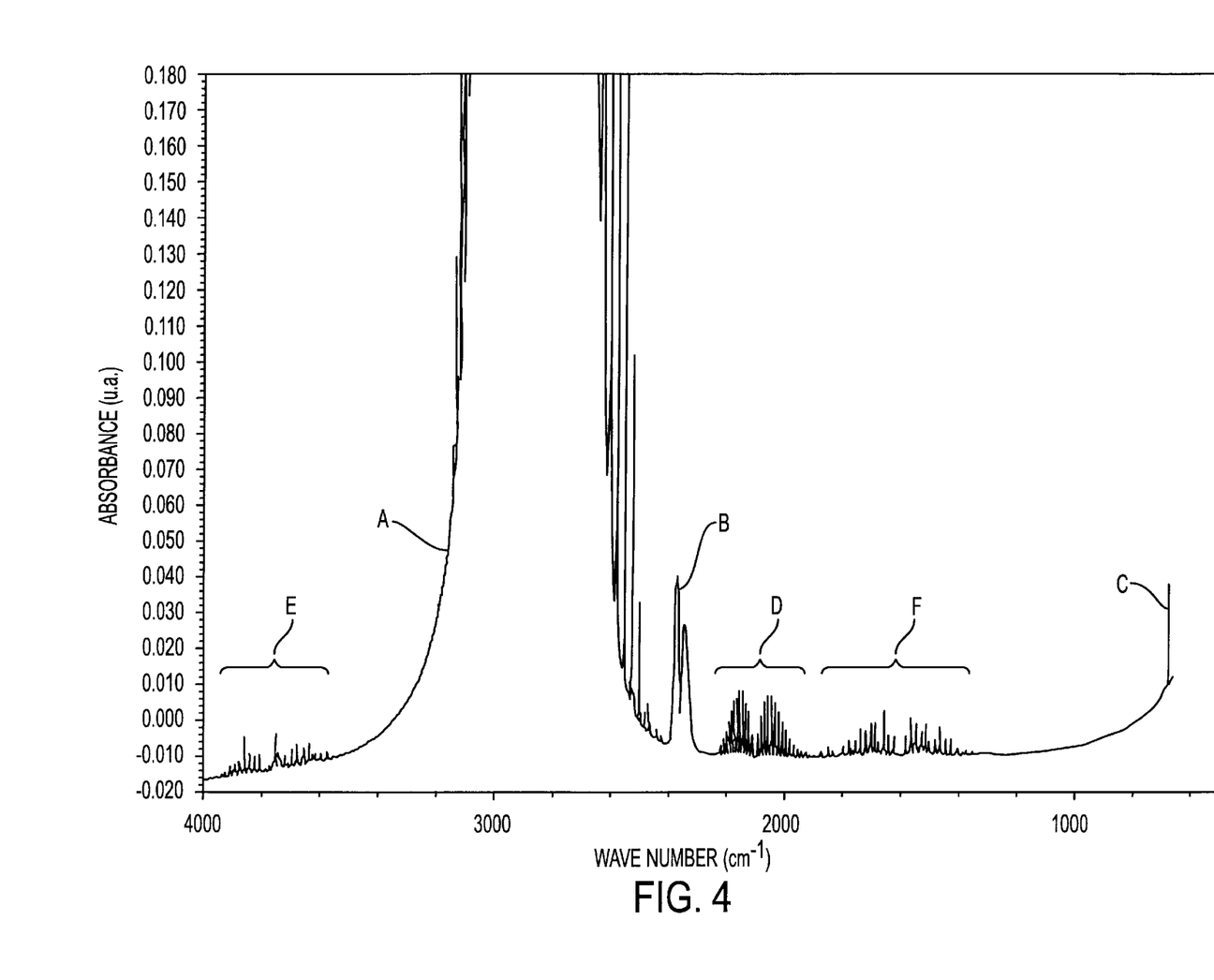
FIG. 4 is a Fourier Transform Infrared (FTIR) spectrum of moist HCl gas.
Figure 5:
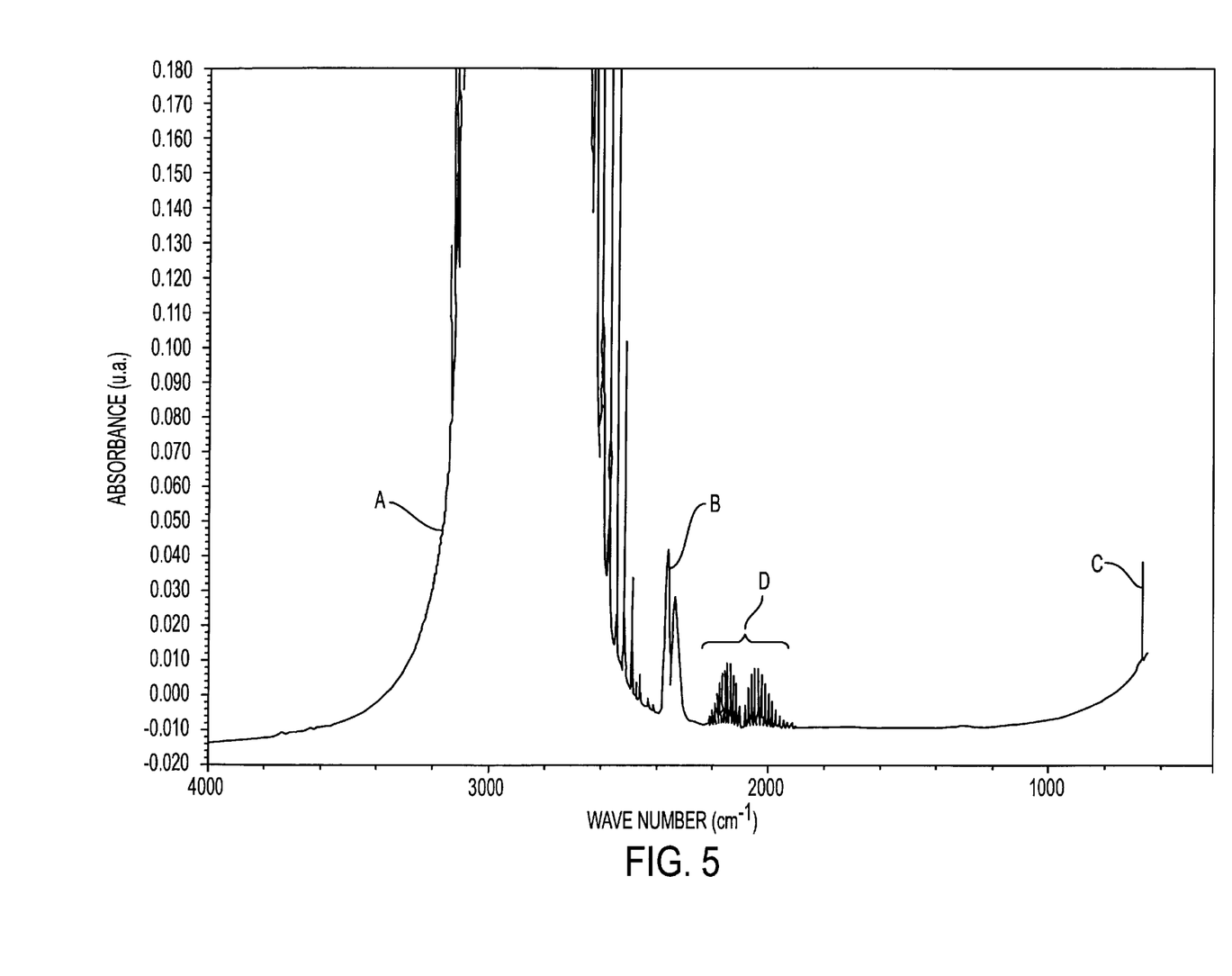
FIG. 5 is a Fourier Transform Infrared (FTIR) spectrum of HCl gas dried according to the process of the present invention.

Additionally, the gas flowing into the purifier is analyzed by diverting some of the gas through a secondary line to the FTIR spectrophotometer. FIGS. 4 and 5 show, respectively, the FTIR spectra of the inlet and outlet gases. The spectra show the infra-red absorbance characteristics of the two gas streams in arbitrary units (a.u.) as a function of wave number ($cm^{-1}$). Both spectra show the following: an intense peak (indicated in the graphs as A) due to absorbance by HCl; several peaks due to absorbance by $CO_2$ (indicated in the graphs as B and C); and a set of peaks (indicated in the graphs as D) believed to be due to absorbance by CO. The FTIR spectrum shown in FIG. 4, collected from the inlet gas flow, further shows two sets of peaks, labeled E and F, due to absorbance by water. These two sets of peaks are absent from the FTIR spectrum in FIG. 5, collected from to the outlet gas flow, demonstrating that the water content in the gas from the purifier outlet was below the instrument's detection limit. The test was stopped when the purifier had sorbed approximately 9 l/l of water. At that time no water detected by the analytic instrument in the gas from the purifier outlet.

EXAMPLE 9

This example relates to the preparation of boron oxide by decomposition of boric acid inside a gas permeable container.

Figure 6:
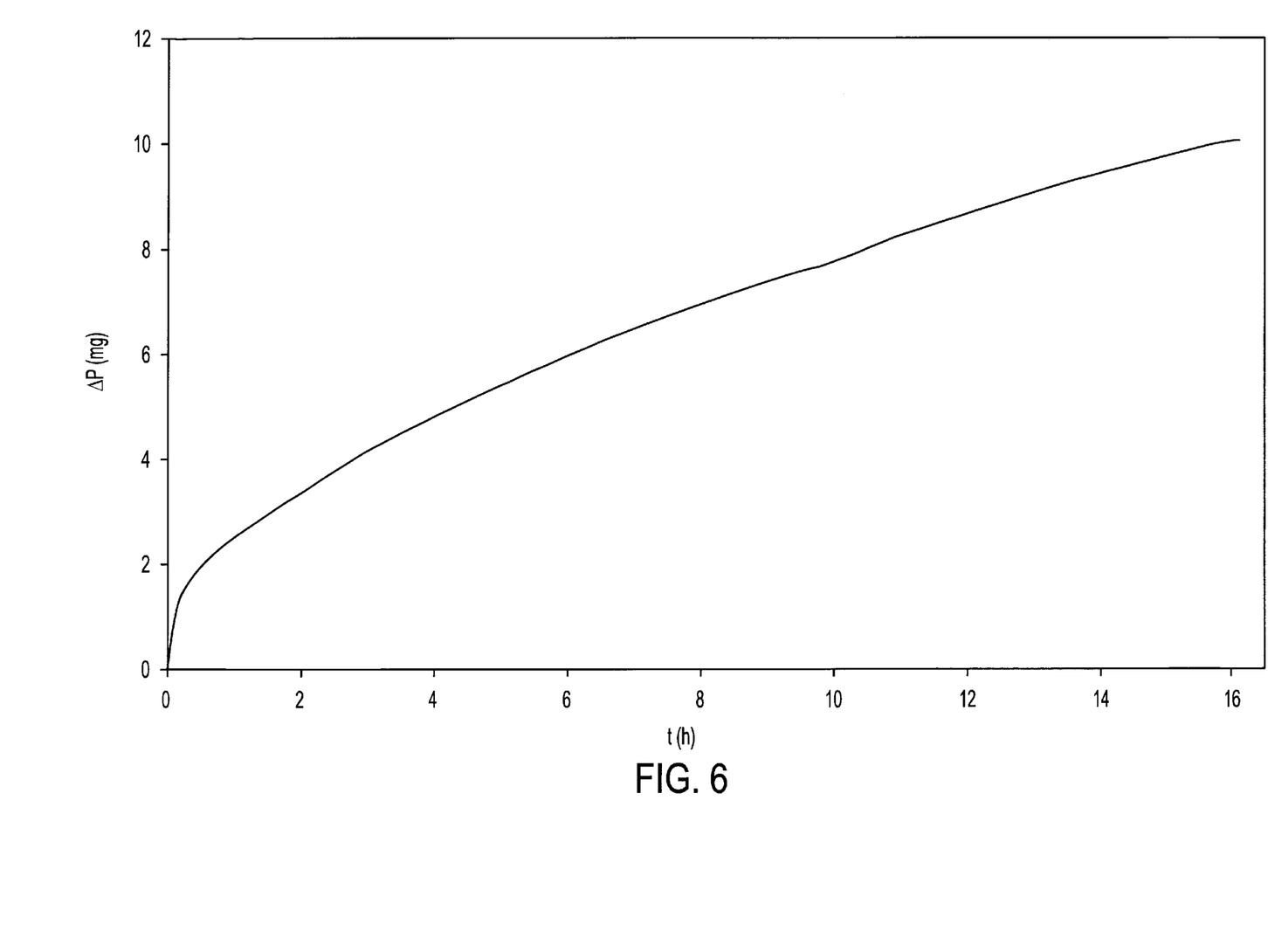
FIG. 6 is a plot of weight increase as a function of time for a water sorption test in a vacuum chamber performed according to an alternative embodiment of the present invention.

51 mg of boric acid employed in Example 1 is loaded into a cylindrical container, made with AISI steel 304, having one end closed, an internal diameter of 7.5 mm, and height of 1.5 mm. The open end of the container is closed with a porous septum of sintered steel AISI 316L, having an average pore size of 1 $\mu$m. The resulting gas permeable container is mounted on the sample-holder of a CAHN model D 200 thermobalance. The thermobalance chamber is evacuated, leaving a residual pressure of $10^{-4}$ mbar, and the decomposition of the boric acid is begun by heating the sample from room temperature to 105° C. at a rate of 2° C./min, followed by maintaining the temperature at 105° C. for 23 hours. A weight loss of 20.3 mg, corresponding to 39.8%, is measured, slightly lower than the theoretical value of 43.7%. The difference can be ascribed to a slightly incomplete decomposition of boric acid, most probably due to the porous septum retarding the emission of water. Still under pumping, the measuring chamber of the thermobalance is allowed to cool to room temperature, at which time water vapor is let in through a needle valve at a pressure of 5 mbar. The weight increase of the sample at 25° C. is measured. The results of this test are provided in FIG. 6, plotted as weight increase in mg as a function of the time in hours. As can be seen in FIG. 6, after 16 hours of testing the sample weight has increased by 10.3 mg, approximately half of the weight of the water lost during the boric acid decomposition.

From the analysis of the results of the above reported examples it can be appreciated that boron oxide obtained by thermal decomposition of boric acid at temperatures in the range of 70° C. to 200° C., either under vacuum or under a dry gas flow, may be effective for sorbing water to levels lower than a few ppb. This effectiveness may be obtained under vacuum and in contact with both inert and reactive gases. Further, the comparison between FTIR spectra in FIGS. 2 and 3 demonstrates that a gas purifier for water sorption according to the present invention does not release impurities into the outlet gas.

While this invention has been described in terms of several preferred embodiments, it is contemplated that alternatives, modifications, permutations and equivalents thereof will become apparent to those skilled in the art upon a reading this specification. It is therefore intended that the following claims include all such alternatives, modifications, permutations and equivalents as fall within the true spirit and scope of the present invention.

What is claimed is:

1. A process for removing water, comprising:

producing boron oxide by the decomposition of boric acid in a reaction chamber; and contacting said boron oxide with one of a gas and an evacuated volume.

2. The process according to claim 1, wherein said boric acid comprises orthoboric acid.

3. The process according to claim 1, wherein said boric acid comprises metaboric acid.

4. The process according to claim 1, wherein said boric acid decomposition is performed under a dry gas flow.

5. The process according to claim 1, wherein said boric acid decomposition is performed at a pressure below about 500 mbar.

6. The process according to claim 4, wherein said dry gas is selected from the group of noble gases, nitrogen, air, and mixtures of these gases.

7. The process according to claim 4, wherein said dry gas is flowed through said reaction chamber at a rate sufficient to replace the atmosphere within said reaction chamber at least five times per minute.

8. The process according to claim 1, wherein said boric acid decomposition is performed at a temperature of between about 70° C. and about 200° C.

9. The process according to claim 1, wherein said boric acid is placed within said reaction chamber in at least one bed, said at least one bed being stackably arranged within said reaction chamber, each said at least one bed having a thickness of no more than about 1 cm.

10. The process according to claim 1, wherein said boric acid is placed on a fluidized bed moving continuously through said reaction chamber.

11. The process according to claim 1, wherein said boric acid is contained within a gas permeable container within said reaction chamber.

12. The process according to claim 11, wherein said boric acid is in the form of pellets.

13. The process according to claim 11, wherein said gas permeable container is formed from stainless steel with a septum.

14. The process according to claim 1, wherein said boron oxide is in the form of pellets.

15. The process according to claim 1, wherein said boron oxide is brought into contact with said gas, said gas being at a temperature below about 120° C.

16. The process according to claim 1, wherein said boron oxide is brought into contact with said evacuated chamber, said evacuated chamber being at a temperature below about 80° C.

17. The process according to claim 15, wherein said gas may be selected from the group consisting of fluorine, chlorine, iodine, bromine, boron trichloride, boron trifluoride, diborane, nitrogen trifluoride, nitrous oxide, nitric oxide, nitrogen dioxide, silane, arsine, phosphine, sulfur hexafluoride, tungsten hexafluoride, chlorine trifluoride, hydrazine, dimethyl hydrazine, and any gas mixture containing one or more of the aforementioned gases.

18. The process according to claim 1, wherein said evacuated chamber is part of an optical amplifier.

* * * * *